United States Patent
Zhou et al.

(10) Patent No.: US 11,180,601 B2
(45) Date of Patent: Nov. 23, 2021

(54) POLYURETHANE DISPERSIONS

(71) Applicant: Hewlett-Packard Development Company, L.P., Spring, TX (US)

(72) Inventors: Zhang-Lin Zhou, San Diego, CA (US); Shao-Wei Li, San Diego, CA (US); Gregg A. Lane, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 16/620,098

(22) PCT Filed: Oct. 19, 2017

(86) PCT No.: PCT/US2017/057331
§ 371 (c)(1),
(2) Date: Dec. 6, 2019

(87) PCT Pub. No.: WO2019/078863
PCT Pub. Date: Apr. 25, 2019

(65) Prior Publication Data
US 2020/0148806 A1    May 14, 2020

(51) Int. Cl.
| | | |
|---|---|---|
| *C08G 18/10* | (2006.01) | |
| *C08G 18/08* | (2006.01) | |
| *C08G 18/62* | (2006.01) | |
| *C08G 18/72* | (2006.01) | |
| *C08G 18/73* | (2006.01) | |
| *C08G 18/75* | (2006.01) | |
| *C09D 11/322* | (2014.01) | |
| *C08G 18/65* | (2006.01) | |
| *C08G 18/24* | (2006.01) | |
| *C08G 18/34* | (2006.01) | |
| *C08F 293/00* | (2006.01) | |
| *C09D 11/102* | (2014.01) | |
| *C09D 11/101* | (2014.01) | |

(52) U.S. Cl.
CPC .......... *C08G 18/10* (2013.01); *C08F 293/005* (2013.01); *C08G 18/0823* (2013.01); *C08G 18/0828* (2013.01); *C08G 18/246* (2013.01); *C08G 18/348* (2013.01); *C08G 18/6204* (2013.01); *C08G 18/625* (2013.01); *C08G 18/6287* (2013.01); *C08G 18/6541* (2013.01); *C08G 18/722* (2013.01); *C08G 18/73* (2013.01); *C08G 18/755* (2013.01); *C08G 18/758* (2013.01); *C09D 11/101* (2013.01); *C09D 11/102* (2013.01); *C09D 11/322* (2013.01)

(58) Field of Classification Search
CPC . C08F 293/005; C08G 18/10; C08G 18/0828; C08G 18/625; C08G 18/6287; C08G 18/722; C08G 18/73; C08G 18/755; C08G 18/758; C08G 18/6204; C08G 18/6541; C08G 18/0823; C08G 18/246; C08G 18/348; C09D 11/322; C09D 11/102; C09D 11/101
See application file for complete search history.

(56) References Cited

U.S. PATENT DOCUMENTS

| | | |
|---|---|---|
| 6,306,947 B1 | 10/2001 | Morishima et al. |
| 8,338,558 B2 | 12/2012 | Richards et al. |
| 8,940,821 B2 | 1/2015 | Brust et al. |
| 9,475,958 B2 | 10/2016 | Berge et al. |
| 9,676,921 B2 | 6/2017 | Belelie et al. |
| 2013/0266776 A1* | 10/2013 | Matsuoka .......... C08G 18/4063 428/195.1 |

FOREIGN PATENT DOCUMENTS

WO    2016122569    8/2016

OTHER PUBLICATIONS

Mishra et al., High-performance waterborne UV-curable polyurethane dispersion based on thiol-acrylate/thiol-epoxy hybrid networks, American Coatings Association, J. Coat. Technol. Res., DOI 10.1077/s11998-016-9906-1, 2017, 13 pages.

Nguyen et al., Providing polyurethane foams with functionality: a kinetic comparison of different "click" and coupling reaction pathways, Polymer Chemistry, 2013, 4, pp. 1546-1556.

International Search Report dated Oct. 19, 2017 for PCT/US2017/057331, Applicant Hewlett-Packard Development Company, L.P.

* cited by examiner

*Primary Examiner* — Patrick D Niland
(74) *Attorney, Agent, or Firm* — Thorpe North & Western LLP (57) ABSTRACT

The present disclosure is drawn to polyurethane dispersions. In one example, a polyurethane dispersion can include a polyurethane with a polymeric ionic side chain and a polymeric non-ionic side chain. The polyurethane can be formed of polymerized monomers including a diisocyanate, a first polymeric diol, and a second polymeric diol. The first polymeric diol can include a first polymer chain replacing a hydrogen atom of a thiol group of a 1-thioglycerol molecule. The first polymer chain can include a block of a polymerized ionic group-containing vinyl monomer. The second polymeric diol can include a second polymer chain replacing a hydrogen atom of a thiol group of a 1-thioglycerol molecule. The second polymer chain can include a block of a polymerized non-ionic vinyl monomer, and the second polymer chain can be devoid of ionic groups.

15 Claims, 6 Drawing Sheets

POLYURETHANE DISPERSIONS

BACKGROUND

There are several reasons that inkjet printing has become a popular way of recording images on various media surfaces. Some of these reasons include low printer noise, variable content recording, capability of high speed recording, and multi-color recording. Additionally, these advantages can be obtained at a relatively low price to consumers. Consumer demand can create pressure to develop inkjet printing systems and inks that can print on a wide variety of media quickly and with good image quality. However, in many cases it can be difficult to balance parameters such as printing speed, jettability of ink, image quality, image durability, and so on.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to polyurethane dispersions, inkjet inks that include the polyurethane dispersions, and inkjet printing systems. In some examples, a polyurethane dispersion can include a polyurethane with a polymeric ionic side chain and a polymeric non-ionic side chain. The polyurethane can be formed by polymerizing monomers, including a diisocyanate, a first polymeric diol, and a second polymeric diol. The first polymeric diol can include a first polymer chain that replaces a hydrogen atom of a thiol group of a 1-thioglycerol molecule. The first polymer chain can include a block of a polymerized ionic group-containing vinyl monomer. The second polymeric diol can include a second polymer chain that replaces a hydrogen atom of a thiol group of a 1-thioglycerol molecule. The second polymer chain can include a block of a polymerized non-ionic vinyl monomer, and the second polymer chain can be devoid of ionic groups.

In certain examples, the ionic group-containing vinyl monomer can include a $-CO_2H$ group, a $-SO_3H$ group, a $-PO_3H_2$ group, or a combination thereof. In further examples, the ionic group-containing monomer can be:

wherein n is an integer from 1 to 20.

In other examples, the non-ionic vinyl monomer of the second polymer chain can include styrene, methyl styrene, acrylonitrile, ethyl acrylate, methyl methacrylate, butyl acrylate, t-butyl acrylate, t-butyl methacrylate, 2-ethylhexyl acrylate, benzyl methacrylate, wherein m, n, and o are each independently integers from 1 to 20 and R is ethyl, propyl, isopropyl, 1-butyl, 2-butyl, or tert-butyl.

In various examples, the first polymeric diol and the second polymeric diol can each have an independent weight average molecular weight from 500 Mw to 10,000 Mw.

In a certain example, the first polymer chain can also include a second block of a polymerized non-ionic vinyl monomer.

In specific examples, the first polymeric diol can be:

In another example, the second polymer chain can also include a second block of an additional polymerized non-ionic vinyl monomer.

In further specific examples, the second polymeric diol can be:

wherein m and n can independently be integers from 1 to 100.

In further examples, the polymerized monomers of the polyurethane dispersion can also include a non-polymeric acid-containing diol.

In some examples, the polyurethanes can terminate at a capping unit selected from:

where m, n, and o can be integers from 1 to 100 and p can be an integer from 1 to 20.

In another example, an inkjet ink can include an aqueous ink vehicle, a pigment, and a polyurethane dispersion. The polyurethane dispersion can include a polyurethane with a polymeric ionic side chain and a polymeric non-ionic side chain. The polyurethane can be formed by polymerizing monomers, including a diisocyanate, a first polymeric diol, and a second polymeric diol. The first polymeric diol can include a first polymer chain replacing a hydrogen atom of a thiol group of a 1-thioglycerol molecule. The first polymer chain can include a block of a polymerized ionic group-containing vinyl monomer. The second polymeric diol can include a second polymer chain replacing a hydrogen atom of a thiol group of a 1-thioglycerol molecule. The second polymer chain can include a block of a polymerized non-ionic vinyl monomer, and the second polymer chain can be devoid of ionic groups.

In one example, the polyurethane dispersion can be UV-curable and the inkjet ink can also include a photoinitiator.

In another example, an inkjet printing system can include an intermediate transfer member, an inkjet ink, and an inkjet printhead positioned to jet the inkjet ink onto the intermediate transfer member. The inkjet ink can include an aqueous ink vehicle, a pigment, and a polyurethane dispersion. The polyurethane dispersion can include a polyurethane with a polymeric ionic side chain and a polymeric non-ionic side chain. The polyurethane can be formed by polymerizing monomers, including a diisocyanate, a first polymeric diol, and a second polymeric diol. The first polymeric diol can include a first polymer chain replacing a hydrogen atom of a thiol group of a 1-thioglycerol molecule. The first polymer chain can include a block of a polymerized ionic group-containing vinyl monomer. The second polymeric diol can include a second polymer chain replacing a hydrogen atom of a thiol group of a 1-thioglycerol molecule. The second polymer chain can include a block of a polymerized non-ionic vinyl monomer, and the second polymer chain can be devoid of ionic groups.

In another example, the polyurethane dispersion can be UV-curable and the system can also include a UV curing lamp positioned to cure inkjet ink after printing.

The polyurethane dispersions described herein can have a dual function as both a binder and a dispersant. Accordingly, inkjet inks can be formulated with the polyurethane dispersions without a need for additional binder or dispersant in the ink. In some examples, inks can be formulated with the polyurethane dispersion, water, pigment, co-solvent, and surfactant.

The polyurethane dispersions can function both as a binder and as a dispersant because of the two different side chains that are incorporated into the polyurethane. As described above, the polyurethane can include a polymeric ionic side chain and a polymeric non-ionic side chain. These side chains can also be referred to as "grafts." Without being bound to a specific mechanism, the polymeric ionic side chain can in some examples give the polyurethane a dispersant-like quality, while the polymeric non-ionic side chain can give the polyurethane a binder-like quality. Including both of these types of side chains can provide a polyurethane that can replace other dispersants and binders in the inkjet ink.

Inkjet inks formulated with the polyurethanes described herein can be particularly useful in transfer inkjet printing processes. In a transfer inkjet printing process, the image is first printed on an intermediate transfer member. The image can then be at least partially dried on the intermediate transfer member before being transferred to the final print medium.

Transfer inkjet printing methods can provide several advantages over inkjet printing in which the ink is jetted directly onto the print medium. In traditional inkjet printing processes, ink is jetted directly onto a print medium, such as paper, where the ink is allowed to dry to form the final printed image. Several variables can potentially affect the final image quality of the printed image. When ink is printed onto paper in a liquid state, the paper can absorb water and/or organic solvents in the ink. However, colorant in the ink can often be absorbed along with the solvents so that a significant portion of the colorant travels below the surface of the paper. Thus, the optical density of the printed image can be less than if all of the colorant had remained at the top surface of the paper. Additionally, absorbing solvents into paper can lead to issues with drying time and paper curling. When used with nonabsorbent print media such as polymeric films, direct inkjet printing can have problems with adherence of the ink to the media, beading of the ink on the media, and durability of the printed image. These problems have led to development of a wide variety of specialty print media with specialized coatings attempting to solve one or more of these issues.

In the transfer inkjet printing methods described herein, the ink can be jetted first onto an intermediate transfer member. In some examples, the ink can then be partially or completely dried on the intermediate transfer member. When the dried image is transferred onto the final print media, all of the colorant in the ink can remain at the top surface of the print media because the colorant is not carried below the surface of the print media by solvents in the ink. Thus, the final printed image can have a high optical density. The ink can also form a durable film on the intermediate transfer member before being transferred to the print medium. Thus, the printed image can have high durability. In some examples, the ink can be curable and the printed image can be cured either before or after the image is transferred to the final print medium.

Inkjet inks have often included an amount of dispersant that increases the dispersibility of pigment particles used to color the inks. Although these dispersants provide satisfactory ink performance in traditional inkjet printing processes, the dispersants can interfere with the transfer inkjet printing processes described herein. In particular, dispersants in the ink can contaminate the surface of the intermediate transfer member, which can lead to image transfer failure. Additionally, large amounts of dispersants in the ink can reduce the durability of the final printed image.

The inkjet inks described herein can include the polyurethane that can act as a dispersant and a binder. The polyurethane is less prone to contaminate the surface of the intermediate transfer member. The inks can be formulated without additional dispersant other than the polyurethane, and thus the inks can perform better in the transfer inkjet printing process.

Although transfer inkjet printing is described as a particular example, the polyurethane dispersions and inkjet inks described herein can be used for a variety of different applications, including direct inkjet printing and other printing processes. The polyurethane dispersion described herein can eliminate compatibility issues between binders and pigment dispersants that can affect inkjet inks generally. This can increase the stability, durability, and reliability of the inks.

In some examples, the polyurethanes described herein can be formed through several successive polymerizations. In one example, formation of the polyurethane can include: forming a first polymeric diol; forming a second polymeric diol; polymerizing a diisocyanate together with the first and second polymer diols; and terminating the polyurethane polymerization with capping units.

Figure 1:
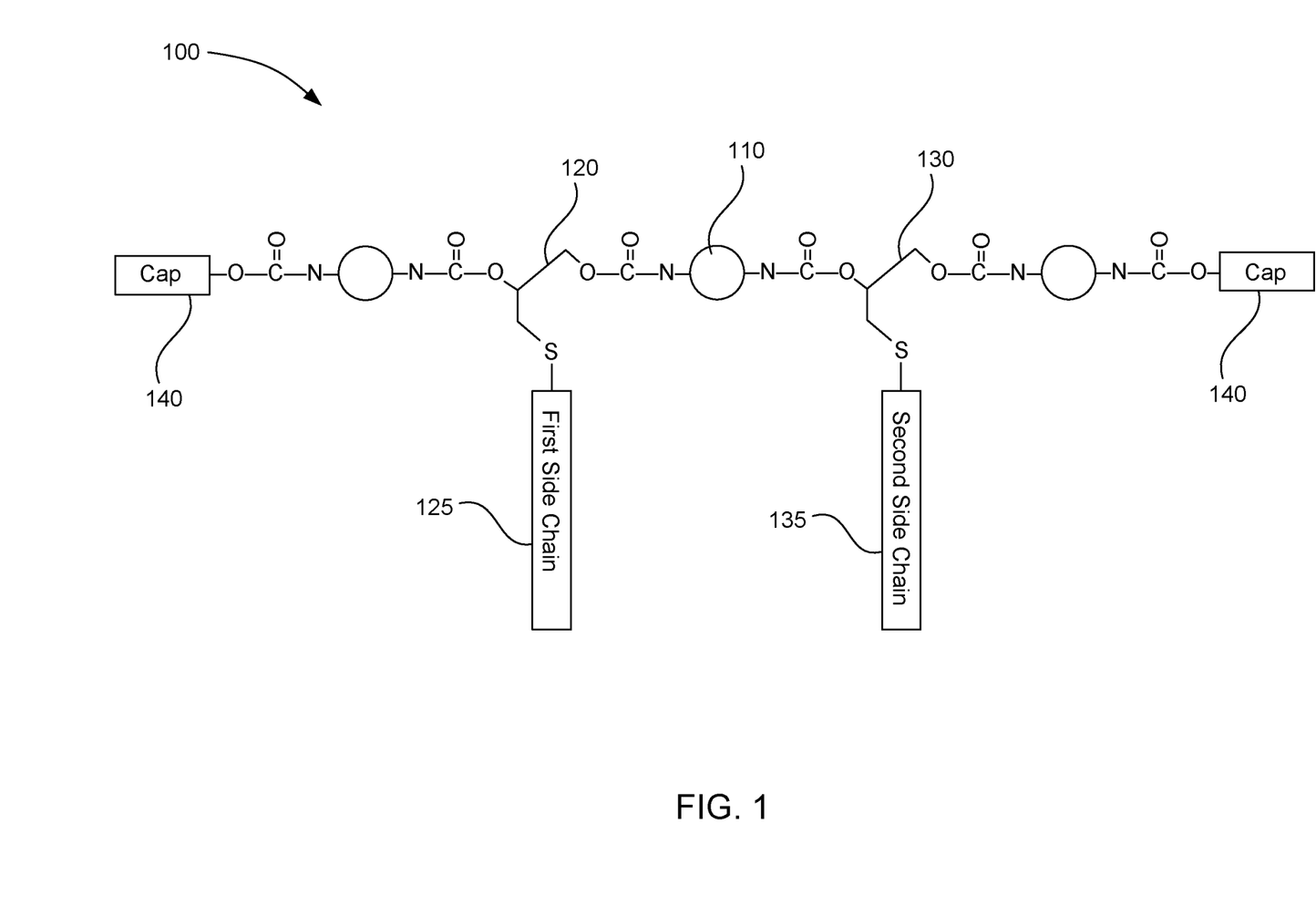
FIG. 1 is an example generalized structure of a polyurethane polymer strand in accordance with the present disclosure.

FIG. 1 shows an example generalized structure of a polyurethane polymer strand 100 according to the present technology. This polyurethane can be formed by polymerizing a diisocyanate 110 with a first polymeric diol 120 that includes a first side chain 125 and a second diol 130 that includes a second side chain 135. The polymerization can be terminated by adding capping units 140. The first side chain can include ionic groups, while the second side chain can be devoid of ionic groups. It should be noted that is only a simplified example, and in many cases the polyurethane polymer strand can have many repeat units of the diisocyanate and the first and second polymeric diols as opposed to only including a single first polymeric diol and a single second polymeric diol as shown in FIG. 1. In this figure, the diisocyanate is depicted as a circle with isocyanate groups attached. The circle can represent a variety of organic groups that can make up the interior of the diisocyanate molecule, and in some cases a mixture of more than one diisocyanate can be used. The side chains are depicted as rectangles, which can represent a variety of polymeric side chains that are described in more detail below. The side chains replace a hydrogen atom of a 1-thioglycerol molecule, such that the side chains are attached to the sulfur atom as shown in FIG. 1. The capping units are also represented as rectangles, which can represent a variety of ionically stabilizing and/or curable organic groups as described in more detail below.

In some examples, the first and second polymeric diols can be formed by polymerizing vinyl monomers. The polymerization can be initiated with 1-thioglycerol in the presence of a suitable initiator such as azoisobutyronitrile (AIBN). Additional examples of initiators include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-Butylperoxy)-2,5-dimethyl-3-hexyne, bis(1-(tert-butylperoxy)-1-methylethyl) benzene, 1,1-bis(tert-butylperoxy)-3,3,5-(dibutyl phthalate) trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

The vinyl monomers can polymerize to form a polymer chain attached to the sulfur atom of the 1-thioglycerol. In some examples, different vinyl monomers can be added sequentially to form a block copolymer chain. The polymerization process can be a living polymerization process that can continue with additional vinyl monomers to form as many blocks as desired. In some examples, the polymerization process can be terminated by adding an alcohol, which will terminate the polymer chain with a hydrogen atom.

Figure 2:
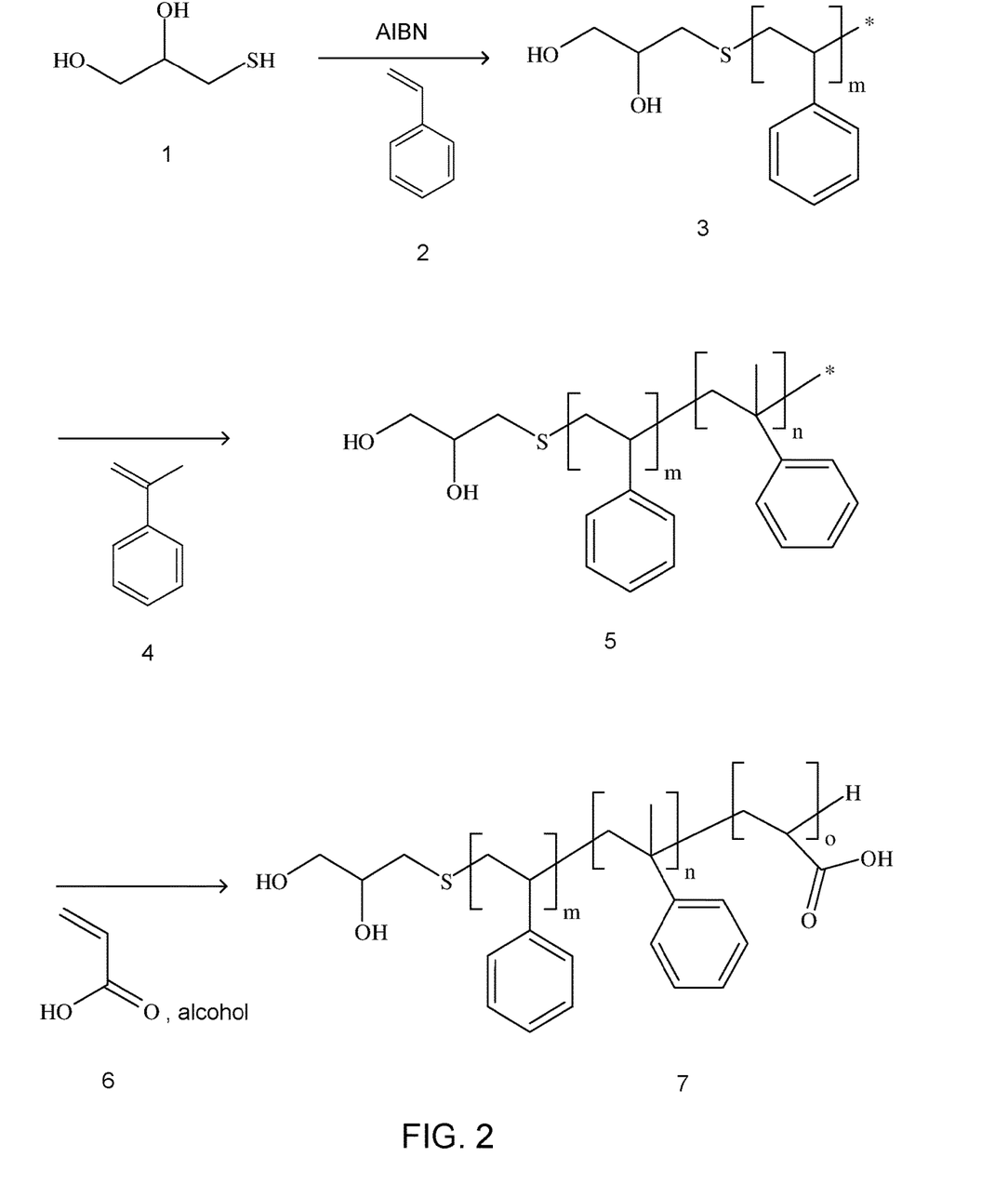
FIG. 2 is an example reaction scheme showing a reaction pathway for forming a first polymeric diol in accordance with the present disclosure.

FIG. 2 is an example reaction scheme showing a reaction pathway for forming a first polymeric diol in accordance with the present disclosure. In this reaction pathway, 1-thioglycerol (1) is reacted with styrene (2) in the presence of AIBN to form a living polymer (3). The asterisk shown in the figure represents a radical at the end of the living polymer chain available for further polymerization. The living polymer is reacted with methyl styrene (4) to form another living polymer (5). This is reacted with acrylic acid (6) followed by an alcohol to terminate the polymerization to yield a polymeric diol (7).

In the example shown in FIG. 2, the final polymeric diol includes a block copolymer chain having blocks of polymerized styrene, methyl styrene, and acrylic acid. When this polymeric diol is incorporated into a polyurethane, the acrylic acid can provide ionic acid groups to help stabilize the polyurethane in an aqueous dispersion as well as providing a dispersant-like quality to the polyurethane. In some examples, the total weight average molecular weight of the polymeric diol can be from 500 to 10,000 Mw. In further examples, m, n, and o can be integers from 1 to 100.

A variety of other polymeric diols can be formed from different vinyl monomers using a similar reaction pathway as that shown in FIG. 2. In these other examples, the resulting polymeric diols can also having a weight average molecular weight from 500 to 10,000 Mw. In some cases, the polymeric diols can include a block copolymer chain with blocks formed of 1 to 100 monomer units. In other examples, the polymeric diol can include a homopolymer chain formed of a single type of monomer.

As mentioned above, the polyurethane can include a first polymeric diol and a second polymeric diol. The first polymeric diol can include a polymerized vinyl monomer that includes an ionic group. In the example shown in FIG. 2, the acrylic acid forms an ionic block having ionic acid groups. In further examples, the first polymeric diol can be formed with an ionic group-containing vinyl monomer that includes a $—CO_2H$ group, a $—SO_3H$ group, a $—PO_3H_2$ group, or a combination thereof. In specific examples, the ionic group-containing monomer can be:

(III)

or (IV)

wherein n is an integer from 1 to 20.

In certain examples, the first polymeric diol can include a block formed of a polymerized ionic group-containing vinyl monomer and a second block formed of a polymerized non-ionic vinyl monomer. Any number of ionic and non-ionic blocks can be included in the first polymeric diol, as long as at least one block includes ionic groups.

Non-limiting specific examples of the first polymeric diol can include:

(VII)

(VIII)

(IX)

(X)

(XI)

where m, n, and o can be integers from 1 to 100 and p can be an integer from 1 to 20.

The second polymeric diol used to form the polyurethane can be nonionic. When the second polymeric diol is included in the final polyurethane, the non-ionic polymer chain can provide a binder-like quality to the polyurethane. In some examples, the second polymeric diol can be formed by polymerizing vinyl monomers that do not include ionic groups, such as: styrene, methyl styrene, acrylonitrile, ethyl acrylate, methyl methacrylate, butyl acrylate, t-butyl acrylate, t-butyl methacrylate, 2-ethylhexyl acrylate, benzyl methacrylate, (V)

or (VI)

wherein m, n, and o are each independently integers from 1 to 20 and R is ethyl, propyl, isopropyl, 1-butyl, 2-butyl, or tert-butyl.

Non-limiting examples of the second polymeric diol can include:

(XII)

(XIII), (XIV), (XV), (XVI)

where m and n can be integers from 1 to 100.

Any of the first and second polymeric diols described above can be polymerized with a diisocyanate to form the polyurethane. In some examples, an additional acid-containing diol can also be included in the polymerization. This acid-containing diol can be a small molecule, non-polymeric diol such as dimethylolpropionic acid (DMPA). Other examples of acid-containing diols can include 2,2-bis(hydroxymethyl) butyric acid and beta-glycerol phosphoric acid. The additional acid-containing diol can provide more acidic groups along the length of the polyurethane polymer strand to increase the dispersibility of the polyurethane in water.

The diisocyanate polymerized in the polyurethane can be a single diisocyanate or a mixture of two or more diisocyanates. The diisocyanate is not particularly limited. Generally, the diisocyanate is a molecule having two isocyanate groups that can react with the hydroxyl groups of diols to form urethane linkages. In some examples, the diisocyanate can be non-reactive. That is, the diisocyanate can be devoid of reactive functional groups other than the isocyanate groups. For example, the diisocyanate can be devoid of acrylate, methacrylate, acrylamide, allyl, styrene, and other functional groups that can participate in UV-curing. In alternate examples, the diisocyanate can include one or more of such functional groups to increase the UV-curability of the polyurethane.

In certain examples, the diisocyanate can be selected from diisocyanates, including:

(XXI)

(XXII), (XXIII), (XXIV), (XXV), (XXVI)

or a combination thereof.

In various examples, the polyurethane can be polymerized in one or more stages. In one example, the diisocyanate, first polymeric diol, second polymeric diol, and the additional acid-containing diol can be polymerized together in a single reaction. This can result in a polyurethane polymer strand that includes the first polymeric diol, second polymeric diol, and acid-containing diol polymerized in random locations along the polymer strand. In another example, the diisocyanate can be polymerized with the first polymeric diol to form a block of the polyurethane polymer strand that includes only the first polymeric diol. In a subsequent stage, the second polymeric diol can be added to form a block that includes only the second polymeric diol. In further examples, the additional acid-containing diol can be added during the first stage, during the second stage, during the first and second stages, or as its own independent stage to form a block of polyurethane including only the acid-containing diol. Accordingly, the structure of the final polyurethane polymer strand can be affected by the sequence of polymerizing the diisocyanate with the first polymeric diol, second polymeric diol, and the additional acid-containing diol.

The amounts of the first polymeric diol, second polymeric diol, and the additional acid-containing diol can be adjusted to affect properties of the final polyurethane. For example, the amount of the first polymeric diol can be increased to give the polyurethane a more dispersant-like quality, or the amount of the second polymeric diol can be increased to give the polyurethane a more binder-like quality. The amount of the acid-containing diol can also be increased to increase the dispersibility of the polyurethane in water. In certain examples, the molar ratio of the first polymeric diol to the second polymeric diol polymerized in the polyurethane can be from 10:1 to 1:10. In other examples, the molar ratio of the first polymeric diol to the second polymeric diol can be from 5:1 to 1:5.

After forming a polymer strand by reacting the diisocyanate, first polymeric diol, second polymeric diol, and optionally the additional acid-containing diol, the polymer strand can be terminated by capping units. The capping units can be added by polymerizing a monofunctional monomer with the isocyanate groups at the terminal ends of the polymer strand.

In some examples, the polymer strand can be capped with the same monofunctional monomer at each end. In other examples, the polymer strand can have a first capping unit at one end and a second, different capping unit at the other end. Examples of monofunctional monomers that can be used to form capping units can include monoalcohols and monoamines. In the case of monoalcohols, the oxygen atom in the hydroxyl group of the monoalcohol can bond to the carbon atom of the isocyanate group at the terminal end of the polyurethane polymer strand. In the case of monoamines, the nitrogen atom of the amine can bond to the carbon atom of the isocyanate group.

In certain examples, the capping units can be formed by reacting an ionic group-containing monoalcohol or monoamine with the isocyanate group at the terminal end of the polyurethane polymer strand. The ionic group can contribute to the dispersibility of the polyurethane in water. In various examples, the ionic group can be a —$CO_2H$ group, a —$SO_3H$ group, a —$PO_3H_2$ group, or a combination thereof. In certain examples, the capping unit can be formed from an ionic group-containing monoamine selected from taurine, 3-(cyclohexylamino)-1-propanesulfonic acid, or 2-(cyclohexylamino)ethanesulfonic acid.

In other examples, the capping units can be formed by reacting a reactive monoalcohol or monoamine with the isocyanate group at the terminal end of the polymer strand. As used herein, "reactive" refers to a functional group that can react to allow for crosslinking. The reactive capping unit can crosslink with reactive capping units of other polymer strands if the polyurethane is cured under UV light, for example. In some examples, the reactive monoalcohol or monoamine can be an acrylate-containing monoalcohol, a methacrylate-containing monoalcohol, an allyl-containing monoalcohol, an allyl-containing monoamine, a styrene-containing monoalcohol, an acrylamide-containing monoalcohol, or a methacrylamide-containing monoalcohol.

In further examples, the polyurethane polymer strand can terminate with a first capping unit that includes a reactive group and a second capping unit that includes an ionic group. In other examples, the polyurethane polymer strand can terminate at capping units selected from:

In further examples, the polyurethane polymer strand can terminate at capping groups formed by reacting another amino acid with an isocyanate group of the diisocyanate. The amino acid can be, for example, 2-alanine, glycine, 1-alanine, valine, glutamine, asparagine, aspartic acid, glutamic acid, phenylalanine, proline, isoleucine, or leucine.

Figure 3A:
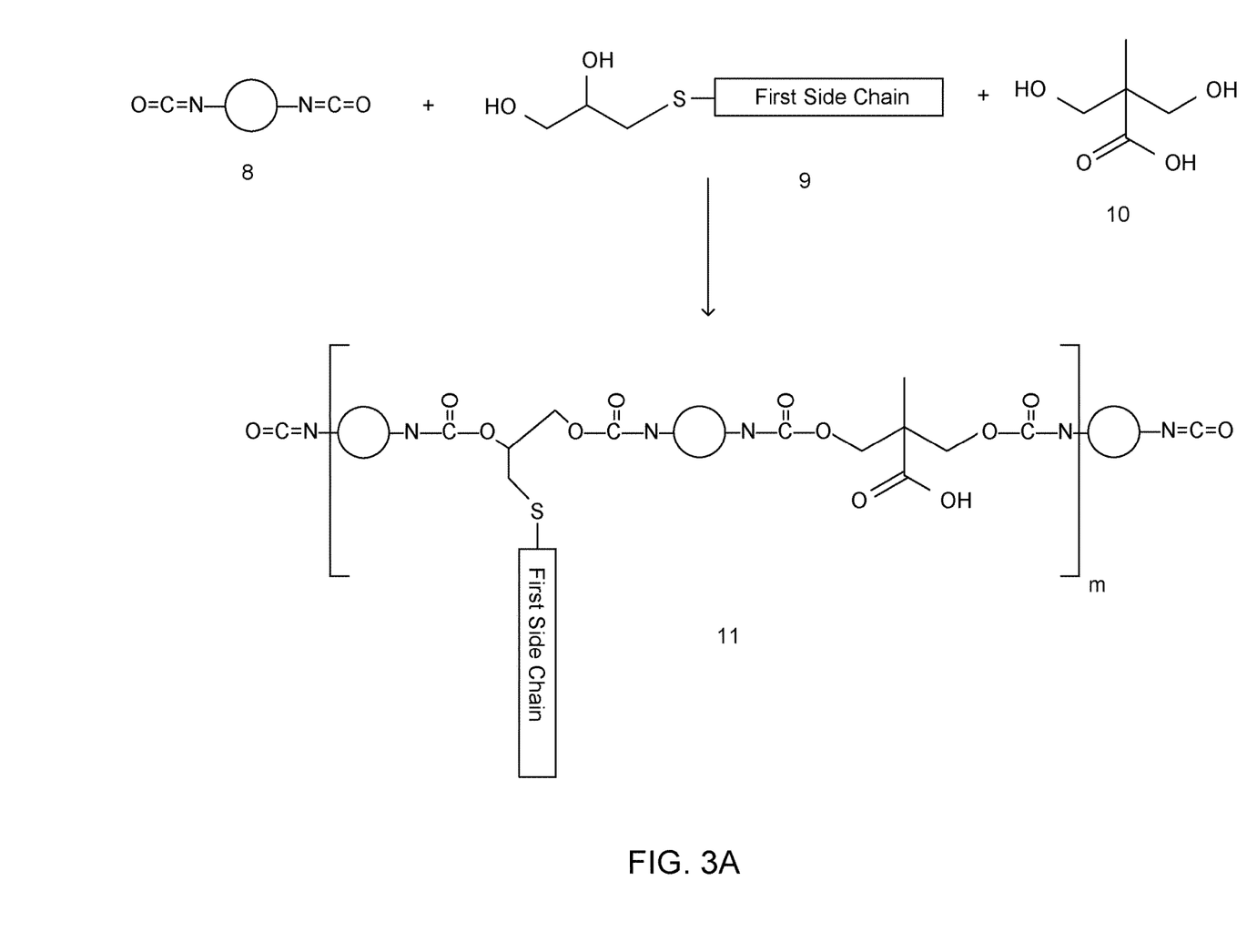
FIGS. 3A-3C are an example reaction scheme showing a reaction pathway for forming a polyurethane polymer in accordance with the present disclosure.
Figure 3B:
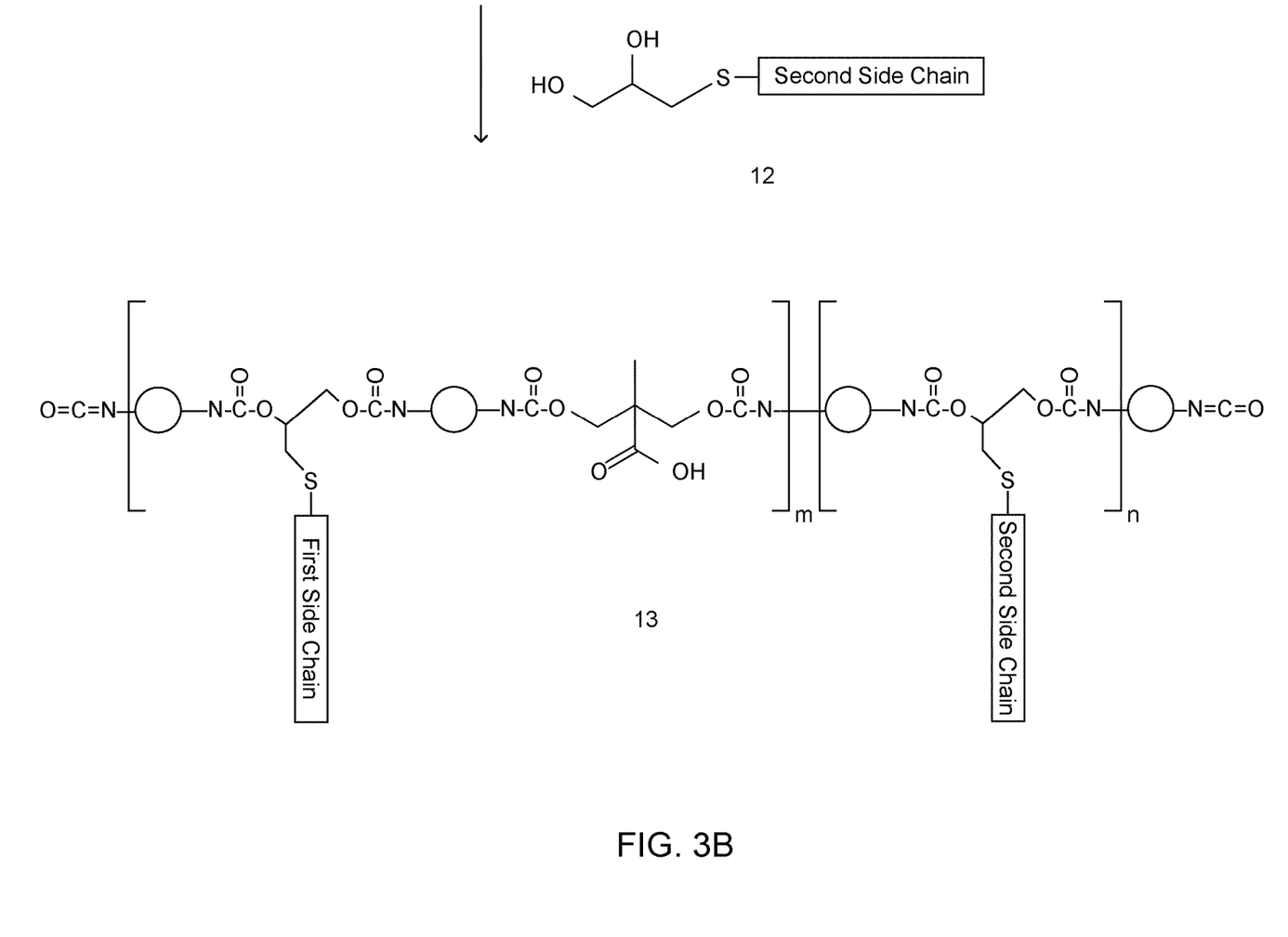
Figure 3C:
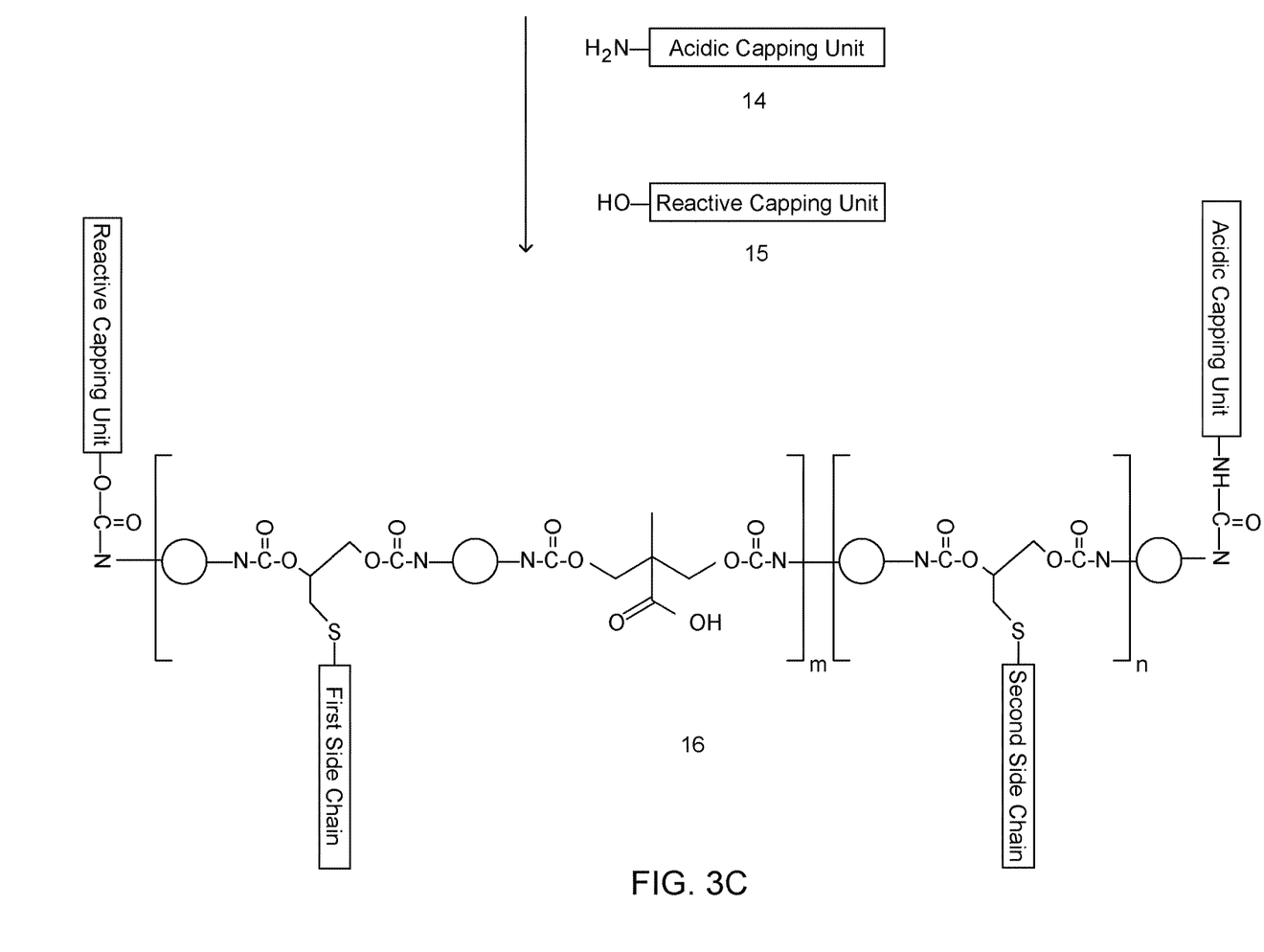

FIGS. 3A-3C are an example reaction scheme showing a reaction pathway for forming a polyurethane polymer in accordance with the present disclosure. First, a diisocyanate (8), a first polymeric diol (9), DMPA (10) are reacted to form a first pre-polymer (11). A second polymeric diol (12) is added to form a second pre-polymer (13). Then, an acid-containing monoamine (14) and a reactive group-containing monoalcohol (15) are added to form the final polyurethane (16). In this example, m and n can independently be integers from 1 to 100. As shown in the figures, the polyurethane can include two blocks, the first block being formed from the first polymeric diol and the DMPA, and the second block being formed from the second polymeric diol. The first block is depicted as including one unit of the polymerized first polymeric diol and one unit of polymerized DMPA, however, in practice the distribution of these monomers would be random because the first polymeric diol and the DMPA were added in a single reaction step.

In further examples, the polyurethane dispersion can have a NCO/OH ratio of 1.02 to 10. In another example, the polyurethane dispersion can have a NCO/OH ratio of 1.2 to 3. As used herein, "NCO/OH ratio" refers to the mole ratio of NCO groups to OH groups in the monomers that react to form the polymer backbone.

In still further examples, the polyurethane dispersion can have a double bond density of 1.5 to 10. In other examples, the polyurethane dispersion can have a double bond density of 2 to 10, 3 to 10, or 4 to 10. As used herein, "double bond density" refers to the number of millimoles of double bonds in 1 g of the polyurethane polymer by dry weight.

The polyurethane dispersions described herein can have an acid number from 20 to 100. In further examples, the polyurethane dispersion can have an acid number from 25 to 80, from 30 to 60, or from 35 to 50. As used herein, "acid number" refers to the number of milligrams of potassium hydroxide required to neutralize one gram of the polyurethane dispersion, by solid weight.

In some examples, the polyurethane dispersions can have a minimum film-forming temperature from −50° C. to 80° C. In further examples, the polyurethane dispersions can have a minimum film-forming temperature from −30° C. to 60° C. or from −25° C. to 50° C.

The molecular weight of the polyurethane can also be controlled. In some examples, the polyurethane dispersion can have a weight average molecular weight $M_w$ from 1,000 to 500,000. In further examples, the polyurethane dispersion can have a $M_w$ from 2,000 to 250,000 or from 3,000 to 100,000.

The polyurethane dispersions described above can be incorporated into inkjet ink compositions. In one example, an inkjet ink can include an aqueous ink vehicle, a pigment, and a polyurethane dispersion as described above. The polyurethane can be included in the ink in any suitable amount, such as from 0.1 wt % to 30 wt %, 0.1 wt % to 10 wt %, 0.5 wt % to 7 wt %, or 0.6 wt % to 5 wt % with respect to the total weight of the ink. The weight percentages for the polyurethane given herein are in terms of dry solids weight of the polyurethane.

In some examples, the aqueous ink vehicle can be water, or water mixed with co-solvents and/or additional additives. In certain examples, water can be present in the inkjet ink composition in an amount of 30 wt % or greater, 40 wt % or greater, 50 wt % or greater, or 60 wt % or greater. In further examples, water can be present in an amount of at most 99 wt % or at most 95 wt %. In particular examples, water can be present in the inkjet ink composition in an amount of 30 wt % to 99 wt %, 40 wt % to 98 wt %, 50 wt % to 95 wt %, 60 wt % to 93 wt %, or 70 wt % to 90 wt %.

The inkjet ink composition can also include a surfactant. Any suitable surfactant may be present. Suitable surfactants may include non-ionic, cationic, and/or anionic surfactants. Examples include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.). Fluorosurfactants may also be employed. When present, the surfactant can be present in the ink in an amount ranging from about 0.01 wt % to about 5 wt % based on the total wt % of the ink.

The inkjet ink composition can also include a co-solvent in addition to water. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate.

A single co-solvent may be used, or several co-solvents may be used in combination. When included, the co-solvent(s) can be present in total in an amount ranging from 0.1 wt % to 60 wt %, depending on the jetting architecture, though amounts outside of this range can also be used. In another example, the co-solvent(s) can be present in an amount from 1 wt % to 30 wt % or from 1 wt % to 20 wt % of the total weight of the inkjet ink.

The inkjet ink can also include various other additives to enhance the properties of the ink composition for specific applications. Examples of these additives include those added to inhibit the growth of microorganisms, viscosity modifiers, materials for pH adjustment, sequestering agents, anti-kogation agents, preservatives, and the like. Such additives may be present in an amount of 0 to 5 wt % of the inkjet composition.

The inkjet ink can also include a pigment. In some examples, the pigment can be present in an amount from about 0.5 wt % to about 15 wt % based on a total wt % of the inkjet ink composition. In one example, the pigment can be present in an amount from about 1 wt % to about 10 wt %. In another example, the pigment can be present in an amount from about 5 wt % to about 10 wt %.

As used herein, "pigment" generally includes organic or inorganic pigment colorants, magnetic particles, aluminas, silicas, and/or other ceramics, organo-metallics or other opaque particles, whether or not such particulates impart color. Thus, although the present description primarily illustrates the use of pigment colorants, the term "pigment" can be used more generally to describe pigment colorants, as well as other pigments such as organometallics, ferrites, ceramics, etc.

Suitable pigments can include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101 F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow 5GT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan colour pigment may include C.I. Pigment Blue −1, −2, −3, −15, −15:1, −15:2, −15:3, −15:4, −16, −22, and −60.

Specific examples of a magenta colour pigment may include C.I. Pigment Red −5, −7, −12, −48, −48:1, −57, −112, −122, −123, −146, −168, −177, −184, −202, and C.I. Pigment Violet-19.

Specific examples of a yellow pigment may include C.I. Pigment Yellow −1, −2, −3, −12, −13, −14, −16, −17, −73, −74, −75, −83, −93, −95, −97, −98, −114, −128, −129, −138, −151, −154, and −180. While several examples have been given herein, it is to be understood that any other pigment or dye can be used that is useful in modifying the colour of the UV curable ink.

Specific examples of black pigment include carbon black pigments. An example of an organic black pigment includes aniline black, such as C.I. Pigment Black 1.

In some examples, the pigment may be a cyan, magenta, black or yellow pigment.

In certain examples, the inkjet inks can be UV-curable. Such inks can include a polyurethane having reactive groups, a photoinitiator, and optionally a sensitizer. The reactive groups of the polyurethane can include nitrile, acrylate, methacrylate, acrylamide, methacrylamide, styrene, allyl, and other reactive groups. The reactive groups can be present in the capping units of the polyurethane, in the first or second polymeric side chains of the polyurethane, or combinations thereof. Together with a photoinitiator and sensitizer, these groups can crosslink upon exposure to UV radiation. In some examples, the ink can be exposed to UV radiation after printing to cure the ink and provide a durable printed image.

In some examples, a photoinitiator can be present in the inkjet ink in an amount from about 0.1 wt % to about 10 wt % based on a total weight of the inkjet ink. In one example, the photoinitiator can be a trimethylbenzoylphenylphosphinic acid metal salt (i.e., TPA salt) having the following chemical structure:

(XXVII)

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

In further examples, the photoinitiator can be used in combination with a sensitizer. The sensitizer can be a water soluble polymeric sensitizer that includes a functionalized anthrone moiety, a polyether chain, and an amide linkage or an ether linkage attaching one end of the polyether chain to the functionalized anthrone moiety. In one example, the anthrone moiety can be a thioxanthrenone moiety. In a particular example, the sensitizer can have the following chemical structure:

(XXVIII)

where $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula above, X is O, S, or NH and the polyether chain has n number of repeating monomer units, where n ranges from 1 to 200. As shown in the formula above, the linkage is an ether linkage.

When present, the sensitizer can be present in an amount of 0.1 wt % to about 10 wt % of the inkjet ink composition.

As mentioned above, the inkjet inks described herein can be particularly useful in transfer inkjet printing processes. Transfer inkjet printing systems can include an intermediate transfer member onto which the ink is jetted before being subsequently transferred to the final print medium. Generally, the intermediate transfer member can have a non-absorbent surface such as a rubber blanket onto which the ink can be printed. The surface of the intermediate transfer member can be formed of a material having a relatively low surface energy to facilitate transfer of the ink image from the surface of the intermediate transfer member to the print medium. Non-limiting examples of such materials can include silicones, fluoro-silicones, synthetic rubbers with fluoropolymer elastomer such as Viton® synthetic rubber (The Chemours Company), and so on.

In further examples, the intermediate transfer member can be heated to dry the ink printed onto the intermediate transfer member. This can be accomplished by an internal heater integrated in the intermediate transfer member or by an external heater positioned near the intermediate transfer member.

Figure 4:
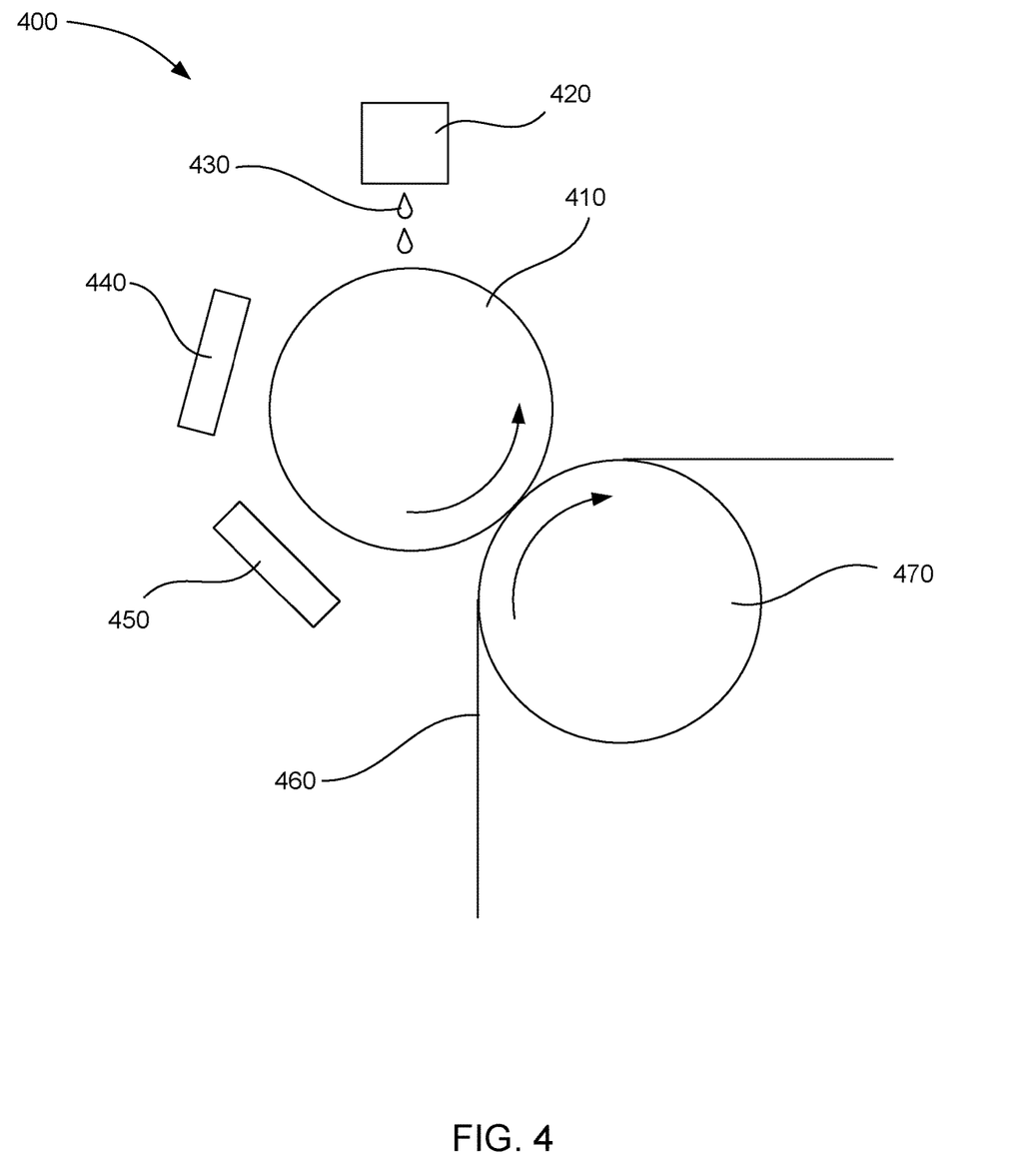
FIG. 4 is a schematic of an example inkjet printing system in accordance with the present disclosure.

FIG. 4 is a schematic of an example inkjet printing system 400. The system includes an intermediate transfer member 410 and an inkjet printhead 420 positioned to jet an inkjet ink 430 onto the intermediate transfer member. The intermediate transfer can rotate so that ink printed onto the surface of the intermediate transfer member passes under a heater 440 to dry the ink. The example shown in this figure also includes a UV curing unit 450 positioned to cure the ink. The dried and cured ink can then be transferred onto a print medium 460 which is fed between the intermediate transfer member and an impression roller 470. In another example, the system can include a UV curing unit positioned to cure the ink after the ink has been transferred onto the print medium.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "UV-curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured either by ultraviolet light from an ultraviolet LED. Ultraviolet LEDs emit light at specific wavelengths. For example, ultraviolet LEDs are available at 365 nm and 395 nm wavelengths, among others.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Synthesis of First Polymeric Diol

A first polymeric diol is formed using the following procedure. 1-thioglycerol is reacted with styrene in the presence of AIBN to form a first living polymer having a block of polymerized styrene monomers. The first living polymer is then reacted with methyl styrene to form a second living polymer having a block of polymerized methyl styrene monomers. The second living polymer is then reacted with acrylic acid to form a third living polymer having a block of polymerized acrylic acid monomers. The polymerization reaction is stopped by adding alcohol to terminate the polymer chain with a hydrogen atom. The final product is a polymeric diol having a block copolymer chain of styrene, methyl styrene, and acrylic acid attached to the sulfur atom of the 1-thioglycerol.

Example 2

Synthesis of Second Polymeric Diol

A second polymeric diol is formed using the following procedure. 1-thioglycerol is reacted with styrene in the presence of AIBN to form a first living polymer having a block of polymerized styrene monomers. The first living polymer is then reacted with methyl styrene to form a second living polymer having a block of polymerized methyl styrene monomers. The polymerization reaction is stopped by adding alcohol to terminate the polymer chain with a hydrogen atom. The final product is a polymeric diol having a block copolymer chain of styrene and methyl styrene attached to the sulfur atom of the 1-thioglycerol.

Example 3

Synthesis of Polyurethane

A mixture of 4,4'-methylene dicyclohexyl diisocyanate (H12MDI) and isophorone diisocyanate (IPDI) is reacted with the first polymeric diol of Example 1 and DMPA in the presence of catalyst such as dibutyl tin dilaurate to form a first prepolymer. The first prepolymer is then reacted with additional H12MDI and IPDI and the second polymeric diol of Example 2 to form a second prepolymer. The second prepolymer is reacted with 2-acrylamido-ethanol to cap a portion of the terminal ends of the second prepolymer with acrylamide-containing reactive groups. Taurine is then added to cap the remaining terminal ends with acidic stabilizing groups. The final product is a polyurethane having first and second side chains with capping units formed from the 2-acrylamido-ethanol and taurine.

Example 4

Inkjet Ink

An inkjet ink is formulated using the polyurethane of Example 3. The inkjet ink includes the polyurethane in amount from 2 wt % to 10 wt %. The ink also includes: 1 wt % to 5 wt % black pigment; 0.1 wt % to 2 wt % surfactant such as SURFYNOL® CT 211; 0.1 to 1.5 wt % of an anti-kogation agent such as a Crodafos® anti-kogation agent (Croda Inc.); 0.1 to 2 wt % of an antimicrobial agent such as 5-chloro-2-methyl-isothiazoline-3-one (CIT), 2-methyl-4-isothiazoline-3-one (CMIT), 2-octyl-4-isothiazolin-3-one (OZT), 4,5-dichloro-2-octyl-4-isothiazolin-3-one (DCOIT), or 1,2-benzisothiazolin-3-one (BIT); 0.5 to 1 wt % of a photoinitiator such as sodium phenyl-(2,4,6-trimethylbenzoyl)phosphinate (TPA Na); 0.5 to 2 wt % of a sensitizer such as a mono-(2-oxythioxanthone) derivative of PEG 550 (TX-PEG-550 sensitizer); and the balance water.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A polyurethane dispersion, comprising a polyurethane with a polymeric ionic side chain and a polymeric non-ionic side chain, the polyurethane formed of polymerized monomers, including:
   a diisocyanate;
   a first polymeric diol comprising a first polymer chain replacing a hydrogen atom of a thiol group of a 1-thioglycerol molecule, the first polymer chain comprising a block of a polymerized ionic group-containing vinyl monomer; and
   a second polymeric diol comprising a second polymer chain replacing a hydrogen atom of a thiol group of a 1-thioglycerol molecule, the second polymer chain comprising a block of a polymerized non-ionic vinyl monomer, wherein the second polymer chain is devoid of ionic groups.

2. The polyurethane dispersion of claim 1, wherein the ionic group-containing vinyl monomer comprises a —$CO_2H$ group, a —$SO_3H$ group, a —$PO_3H_2$ group, or a combination thereof.

3. The polyurethane dispersion of claim 1, wherein the ionic group-containing vinyl monomer is:

wherein n is an integer from 1 to 20.

4. The polyurethane dispersion of claim 1, wherein the non-ionic vinyl monomer is styrene, methyl styrene, acrylonitrile, ethyl acrylate, methyl methacrylate, butyl acrylate, t-butyl acrylate, t-butyl methacrylate, 2-ethylhexyl acrylate, benzyl methacrylate, or wherein m, n, and o are each independently integers from 1 to 20 and R is ethyl, propyl, isopropyl, 1-butyl, 2-butyl, or tert-butyl.

5. The polyurethane dispersion of claim 1, wherein the first polymeric diol and the second polymeric diol each have an independent weight average molecular weight from 500 Mw to 10,000 Mw.

6. The polyurethane dispersion of claim 1, wherein the first polymer chain further comprises a second block of a polymerized non-ionic vinyl monomer.

7. The polyurethane dispersion of claim 1, wherein the first polymeric diol is:

(VII)

(VIII)

(IX)

(X)

or (XI)

where m, n, and o are integers from 1 to 100, and p is an integer from 1 to 20.

8. The polyurethane dispersion of claim 1, wherein the second polymer chain further comprises a second block of an additional polymerized non-ionic vinyl monomer.

9. The polyurethane dispersion of claim 1, wherein the second polymeric diol is:

(XII)

(XIII)

(XIV)

(XV) or (XVI)

where m and n are independently integers from 1 to 100.

10. The polyurethane dispersion of claim 1, wherein the polymerized monomers of the polyurethane dispersion further comprise a non-polymeric acid-containing diol.

11. The polyurethane dispersion of claim 1, wherein the polyurethane terminates at a capping unit selected from:

2-alanine, glycine, 1-alanine, valine, glutamine, asparagine, aspartic acid, glutamic acid, phenylalanine, proline, isoleucine, leucine, (XVII)

(XVIII)

(XIX)

(XX)

12. An inkjet ink, comprising:
an aqueous ink vehicle;
a pigment; and
a polyurethane dispersion, comprising a polyurethane with a polymeric ionic side chain and a polymeric non-ionic side chain, the polyurethane formed of polymerized monomers, comprising:
 a diisocyanate,
 a first polymeric diol comprising a first polymer chain replacing a hydrogen atom of a thiol group of a 1-thioglycerol molecule, the first polymer chain comprising a block of a polymerized ionic group-containing vinyl monomer, and
 a second polymeric diol comprising a second polymer chain replacing a hydrogen atom of a thiol group of a 1-thioglycerol molecule, the second polymer chain comprising a block of a polymerized non-ionic vinyl monomer, wherein the second polymer chain is devoid of ionic groups.

13. The inkjet ink of claim 12, wherein the polyurethane dispersion is UV-curable and the inkjet ink further comprises a photoinitiator.

14. An inkjet printing system, comprising:
an intermediate transfer member;
an inkjet ink comprising:
 an aqueous ink vehicle,
 a pigment, and
 a polyurethane dispersion, comprising a polyurethane with a polymeric ionic side chain and a polymeric non-ionic side chain, the polyurethane formed of polymerized monomers, including:
  a diisocyanate,
  a first polymeric diol comprising a first polymer chain replacing a hydrogen atom of a thiol group of a 1-thioglycerol molecule, the first polymer chain comprising a block of a polymerized ionic group-containing vinyl monomer, and
  a second polymeric diol comprising a second polymer chain replacing a hydrogen atom of a thiol group of a 1-thioglycerol molecule, the second polymer chain comprising a block of a polymerized non-ionic vinyl monomer, wherein the second polymer chain is devoid of ionic groups; and
an inkjet printhead positioned to jet the inkjet ink onto the intermediate transfer member.

15. The inkjet printing system of claim 14, wherein the polyurethane dispersion is UV-curable and the system further comprising a UV curing lamp positioned to cure inkjet ink after printing.

* * * * *